(12) United States Patent
Karpenko (10) Patent No.: US 10,495,175 B2
(45) Date of Patent: Dec. 3, 2019

(54) COMPOSITE MATERIALS HAVING EMBEDDED METAL ROPES FOR INCREASED DAMPING CAPACITY AND METHODS OF MANUFACTURING SAME

(71) Applicant: Ford Global Technologies, LLC, Dearborn, MI (US)

(72) Inventor: Yuri Anatoly Karpenko, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/671,878

(22) Filed: Aug. 8, 2017

(65) Prior Publication Data
US 2019/0048958 A1 Feb. 14, 2019

(51) Int. Cl.
| F16F 7/02 | (2006.01) |
| F16F 15/02 | (2006.01) |
| B29C 45/14 | (2006.01) |
| B29C 70/70 | (2006.01) |
| B29K 101/12 | (2006.01) |
| B29K 705/12 | (2006.01) |
| B29L 31/00 | (2006.01) |
| B29L 31/30 | (2006.01) |

(52) U.S. Cl.
CPC .......... *F16F 7/02* (2013.01); *B29C 45/14549* (2013.01); *B29C 45/14631* (2013.01); *B29C 70/70* (2013.01); *F16F 15/02* (2013.01); *B29K 2101/12* (2013.01); *B29K 2705/12* (2013.01); *B29L 2031/30* (2013.01); *B29L 2031/721* (2013.01); *F16F 2222/04* (2013.01)

(58) Field of Classification Search
CPC ...... F16F 15/02; F16F 7/02; F16F 7/14; F16F 15/022; F16F 2222/04; B29C 45/14549; B29K 2101/12; B29K 2705/12; B29L 2031/721
USPC ......................................................... 188/381
See application file for complete search history.

(56) References Cited

U.S. PATENT DOCUMENTS

| 3,286,799 | A | * | 11/1966 | Shilton | ............... F16D 65/0006 188/218 A |
| 4,445,951 | A | * | 5/1984 | Lind | ..................... B29B 15/105 112/401 |
| 4,990,207 | A | * | 2/1991 | Sakai | .................... B29C 70/345 156/242 |

(Continued)

*Primary Examiner* — Bradley T King
*Assistant Examiner* — Mahbubur Rashid (57) ABSTRACT

A method and system for increasing damping capacity utilizing dry friction between individual wires of a rope embedded in a component formed from a composite is illustrated. The individual wires allow inter-wire friction to occur during part vibration. The component includes a body that is a molded matrix formed form a composite material. The body may be of any material selected from the group consisting of a polymer, a metal or a ceramic material. One or more vibration-damping ropes are embedded in the body. The vibration-damping ropes may be elongated segments or may be a rope having connected ends that form one or more rings. Each vibration-damping rope includes an outer layer of wires that surrounds a plurality of inner wires. Inflowing composite material is prevented from passing by the outer layer of wires and into the inner wires during the manufacturing process, thereby forming voids between the inner wires.

6 Claims, 6 Drawing Sheets

(56) References Cited

U.S. PATENT DOCUMENTS

| | | | | |
|---|---|---|---|---|
| 4,991,827 | A | * | 2/1991 | Taylor .................. B21F 35/003 |
| | | | | 267/149 |
| 5,208,051 | A | * | 5/1993 | Berg ...................... B29C 43/32 |
| | | | | 264/313 |
| 7,144,625 | B2 | | 12/2006 | Tunis |
| 7,975,750 | B2 | * | 7/2011 | Dessouki ............ F16D 65/0018 |
| | | | | 164/100 |
| 8,104,162 | B2 | * | 1/2012 | Golden ................. B22D 19/00 |
| | | | | 188/381 |
| 2004/0242096 | A1 | | 12/2004 | Prakash |
| 2005/0039992 | A1 | * | 2/2005 | Hurwic .............. F16D 65/0006 |
| | | | | 188/73.35 |
| 2010/0314210 | A1 | * | 12/2010 | Amano .................... F16F 7/08 |
| | | | | 188/381 |
| 2011/0132706 | A1 | * | 6/2011 | Tamura .................. F16F 15/02 |
| | | | | 188/381 |
| 2016/0097433 | A1 | | 4/2016 | Karpenko et al. |

* cited by examiner

COMPOSITE MATERIALS HAVING EMBEDDED METAL ROPES FOR INCREASED DAMPING CAPACITY AND METHODS OF MANUFACTURING SAME

TECHNICAL FIELD

The disclosed inventive concept relates to components, such as vehicle components, made from composite materials. More particularly, the disclosed inventive concept relates to such components having metal cables or ropes embedded into the composite material during the molding process. The damping capacity is increased by providing such cables or ropes comprising plural individual wires that are either linear or twisted relative to one another and are embedded into the part during the molding process.

BACKGROUND OF THE INVENTION

Composite materials are used in a wide variety of applications, particularly in the automotive sector. Such applications include, for example, vehicle body panels as well as vehicle frame components. Newer wheel constructions include composite materials being used as center elements attached to aluminum rims.

The composite material used in such applications is made by combining two or more individual materials in both continuous and discontinuous forms to maximize their useful properties and to minimize their weaknesses. The material in the continuous form is called matrix while the material in the discontinuous form is embedded (or dispersed) in the matrix. The embedded material is usually stronger than the surrounding matrix material, and thus is sometimes called reinforcing material.

Reinforcing materials are usually in the form of plates, fibers or particles that have random or preferred orientation within the matrix. The matrix binds the reinforcing materials together somewhat like an adhesive, thereby making them more resistant to external damage. The reinforcing materials make the matrix stronger and stiffer and help it to resist cracks and fractures. The reinforcing materials are typically glass, carbon, silicon carbide, or asbestos, while the matrix is usually a polymer, metal, or ceramic material.

The primary advantages of known composite materials are their net high strength, relatively low weight, and high degree of corrosion resistance. These advantages provide the main reasons for the increasing use of composite materials for industrial applications in which the component from a composite material has no or somewhat limited exposure to dynamic loading such as shocks, impacts or repeated cyclic loading.

Dynamic loading can cause composites to fail on both the microscopic or macroscopic scale. Macroscopic scale failures can be net section failures of the part due to material fatigue resulting from the cyclic variation of the induced stress. A microscopic scale failure can occur when one or more of the layers in the composite fail in tension of the matrix or in the bond between the matrix and fibers or at each individual reinforcing fiber in compression buckling. This can occur due to either material fatigue resulting from the cyclic variation of the induced stress or due to high instantaneous stress caused by the impact or shock loading. The poor performance of the known composite materials under dynamic loading is mainly attributed to their relatively low internal damping, i.e., their inability to quickly convert vibrational or impact energy to heat or sound.

To aid in predicting and preventing failures, composites are extensively tested before and after construction, which appears to have discouraged their widespread use. The expanded use of composite materials is further restricted according to known technology as composites are generally known to have relatively poor bearing strength when compared to metals.

In view of the state of the art, it may be advantageous to provide composite components with appropriate cast-in components that aid in damping. As in so many areas of manufacturing technology, there is always room for improvement in damping by adding friction damping to interacting mechanical and structural components.

SUMMARY OF THE INVENTION

The disclosed inventive concept provides a method and system for increasing damping capacity in components formed from composite materials by utilizing dry friction between individual wires of an embedded rope. The rope is embedded into the component during the casting process. The individual wires allow inter-wire friction to occur during part vibration. The strength of the individual wires is preferably higher than that of the surrounding composite material, thereby increasing the amount of friction damping that the inter-wire friction provides to the damped composite component.

The vibration-damped component according to the disclosed inventive concept includes a body that is a molded matrix formed form a composite material. The body may be of any material selected from the group consisting of a polymer, a metal or a ceramic material. One or more vibration-damping ropes are embedded in the body, having been placed in the component mold prior to insertion of the composite material. The vibration-damping ropes may be elongated segments or may be a rope having connected ends that form one or more rings or loops.

Each vibration-damping rope includes an outer layer of wires that surrounds a plurality of inner wires. The rope is tightly bound such that the inflowing composite material is prevented from passing by the outer layer of wires to which it adheres and into the inner wires during the manufacturing process. Accordingly, the voids between the inner wires are free of composite material, thereby allowing sliding movement of the inner wires relative to one another and to the outer wires to dampen resonant vibration of the component.

The examples of the possible layouts for the metal ropes include but not limited to the layouts where: 1) individual wires of at least one metal rope or of at least one bundle of woven metal ropes are arranged in an entangled form (or in a random form); 2) the individual ropes and the rope bundles are combined in a mesh form or in an entangled form; 3) the metal ropes are in the form of fibers of various length in the random or a specific pattern orientations; and 4) there is a combination of these layouts. In addition, the wire ropes that are either in continuous form or in a discontinuous form (fibers) as well as in a combination of both can also be arraigned to create uniformly or non-uniformly distributed desired custom markings on the composite component exterior surfaces that would have a predetermined size and shape, e.g., a company logo.

The component may be any of a number of shapes, including without limitation disk-shaped, square-shaped or rectangular shaped. The component may also be selected from the group consisting of a beam, a plate, a solid body, a body having voids that are sealed from the environment, and a body having voids that are not sealed from the environment. Any such component may be adapted for any of several uses.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

Figure 7:
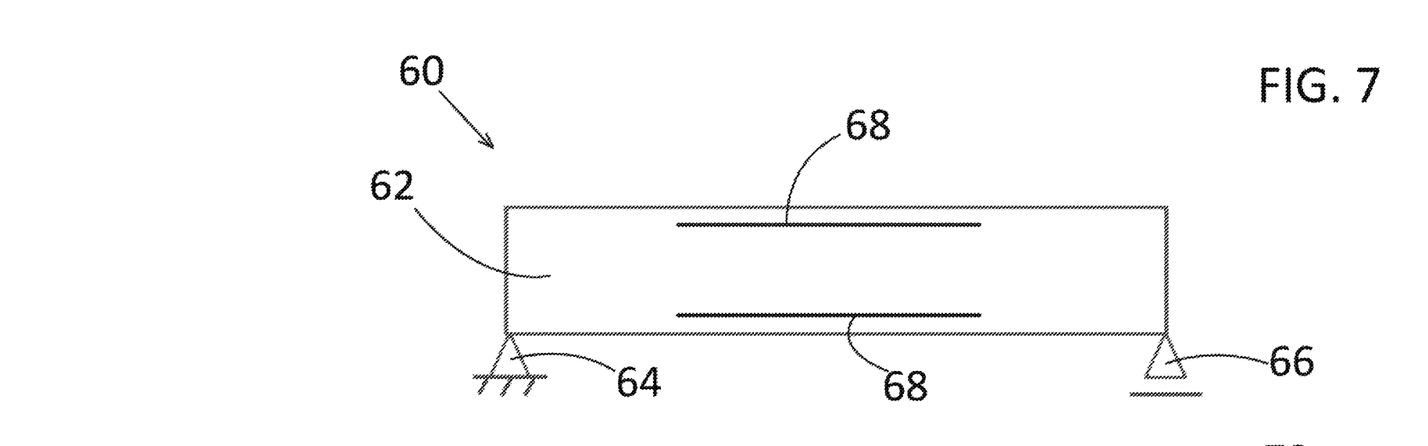
FIG. 7 is sectional view of a pin-pinned beam structure formed from a composite material having embedded metal ropes according to the disclosed inventive concept.
Figure 8:
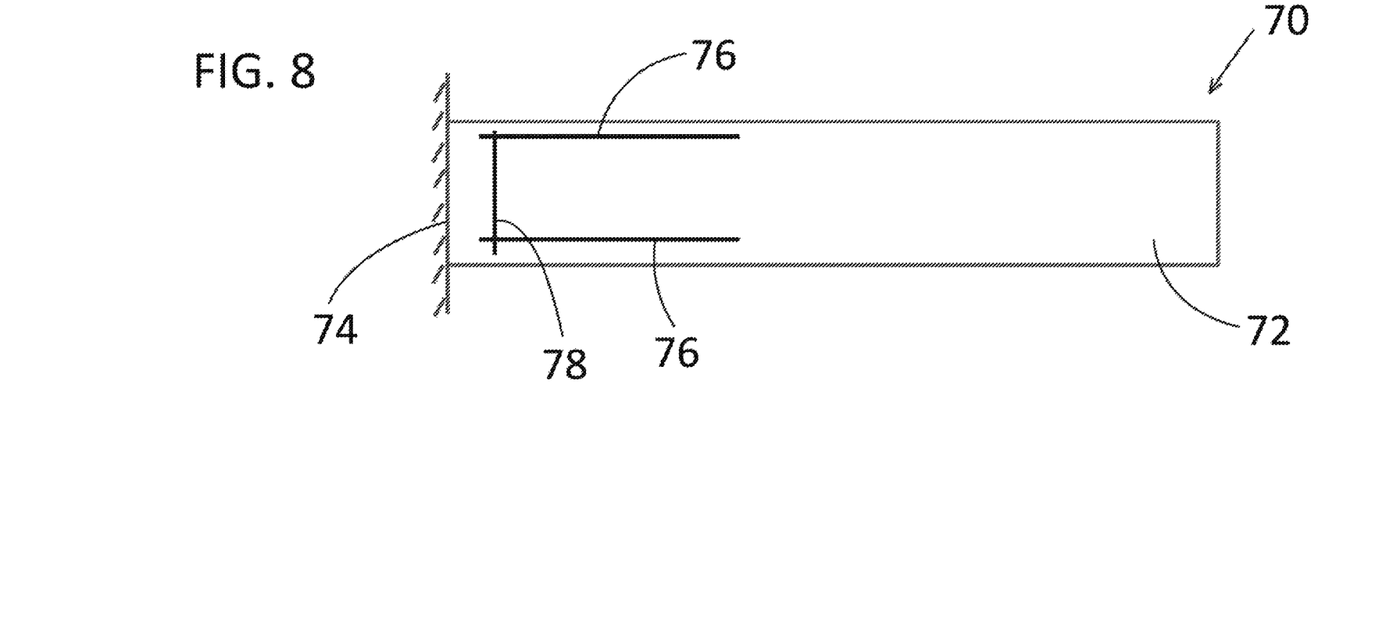
FIG. 8 is sectional view of a cantilevered beam structure formed from a composite material having embedded metal ropes according to the disclosed inventive concept.
Figure 9:
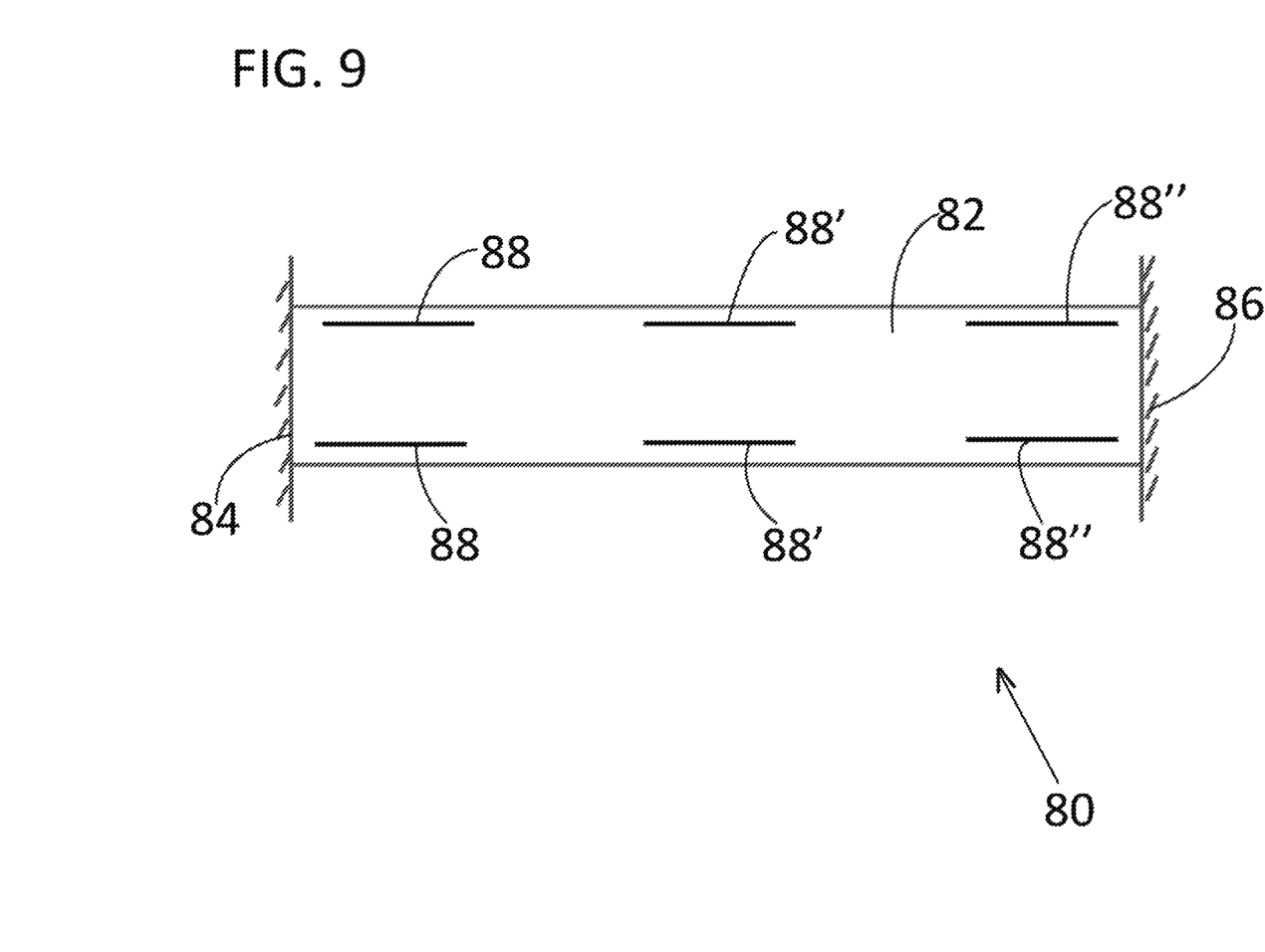
FIG. 9 is sectional view of a clamped-clamped beam structure formed from a composite material having embedded metal ropes according to the disclosed inventive concept.

The accompanying figures and the associated description illustrate the construction and use of vibration-damping ropes in composite material according to the disclosed inventive concept. Particularly, FIGS. 1 through 6 illustrate the rope embedded in several individual components for use in multiple applications. FIGS. 7 through 9 illustrate the rope embedded in a beam shown in multiple applications. It is to be understood that the illustrated configurations are suggestive only and are not intended as being limiting as other configurations may be adapted for use with the rope embedded in a composite material without deviating from either the spirit or scope of the disclosed inventive concept.

For each of the examples of the disclosed inventive concept presented herein and illustrated in the accompanying figures, the embedded rope introduces friction damping into the composite material due to inter-wire friction. Studies have shown that a localized introduction of Coulomb friction damping into the structural components of the dynamic applications can be very effective in attenuating their resonant vibration. In general, the optimum location for a friction damper is the region of the structural component where it develops either the highest levels of vibration or of cyclic stresses. Thus, the use of the metal ropes only as a reinforcing material that is uniformly dispersed within the matrix while extending the use of composites to the some dynamic applications takes advantage only of the metal high strength and the high stiffness which is not very cost effective for many mass production applications. Instead, the disclosed inventive concept takes full advantage of the use of vibration-damping ropes across a wide range of possible applications.

To reduce the sensitivity of composites to dynamic loading, the present inventive concept increases their damping capacity. This is done by embedding metal cables or ropes (which, in general, are not straight) into the local regions of composite materials during molding process where the individual wires have relatively large surface area and friction coefficient in the range from 0.2 to 0.4 (an optimal range for providing friction damping). The increase in damping performance of the resulting composite material is due to the dry, composite-free inter-wire friction within the embedded cables which develops between the surfaces of individual wires upon dynamic loading of a structure utilizing the new material.

In order to improve the sensitivity of composite materials to dynamic loading, the disclosed inventive concept increases internal damping of the material. The damping capacity of composite materials is increased by utilizing Coulomb friction between individual wires of at least one metal rope or of at least one bundle of woven metal ropes in a mesh form or in an entangled form which are embedded into a composite material during the molding process. If needed, the metal ropes can also be used in some combination of the individual ropes and of the rope bundles in a mesh form or in an entangled form. In each case, individual wires of metal ropes have a tensile strength of 201 MPa or higher.

In order to improve bearing strength of composite materials, a localized region of the component which might be subjected to a concentrated load could be reinforced with additional metal wire ropes either in an individual or in a mesh form embedded into the composition mix as required.

In order to avoid a negative impact of adding metal wire ropes on the moldability of the composite material, the average diameter of the wire ropes is limited to being only ten to one hundred times larger than that of the fibers and their total weight percentage is restricted to be only 1%-5% of the overall mix weight. For metal wire ropes in a mesh form, the dimensions of an opening of the mesh, a wire diameter and/or wire bundle diameter, respectively, are optimized for a specific application during the development phase.

The damping due to the inter-wire friction within the wire cables is introduced only at the composite structure areas that have relatively high vibration levels. Since, as a general matter, the distribution of the high vibration areas within any structure is non-uniform and is highly localized as noted above, the vibration-damping rope distribution within the composite structure is also localized and is non-uniform. This is a key difference from the prior art in which cables were introduced into structures uniformly only in order to reinforce these structures. This was accomplished by providing a bond between all of the individual wires within the cables with the base material, thereby eliminating inter-wire friction inside the cables and, consequently, preventing friction damping. Conversely, the disclosed inventive concept provides a solid bond between the base composite material and the vibration-damping rope surface only at its outer surface thereby allowing the inner wire surfaces to preserve their frictional contact.

Figure 1:
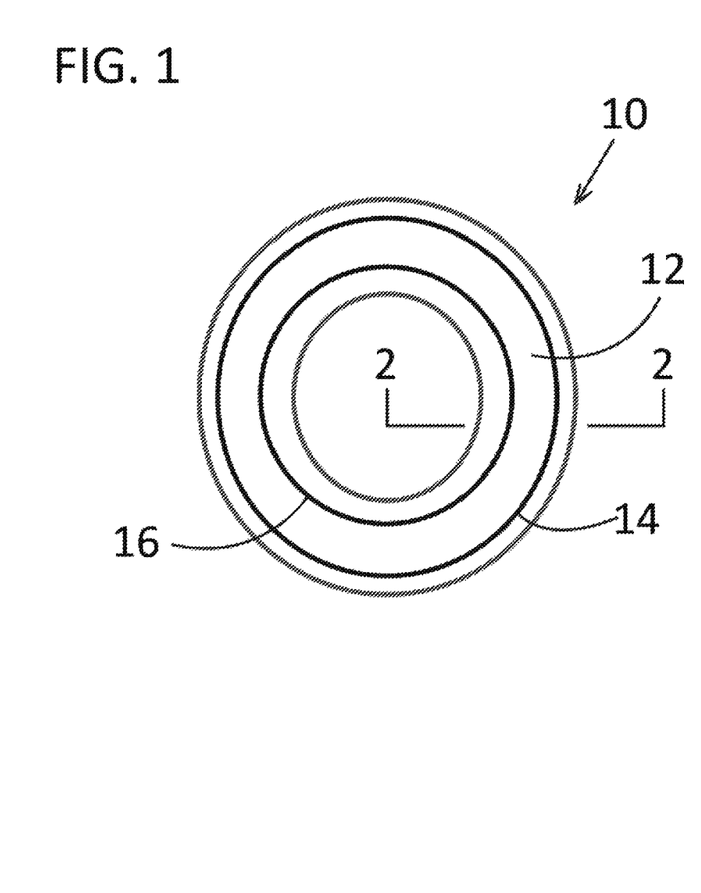
FIG. 1 is a sectional view of a plate- or disk-shaped component formed from a composite material having one configuration of embedded metal ropes according to an embodiment of the disclosed inventive concept.

Referring to FIG. 1, a sectional view of a hypothetical plate- or disk-shaped component 10 is illustrated. The hypothetical plate-shaped component 10 includes a body 12 that is preferably formed from a thermoplastic polymer, although other materials such as a metal or a ceramic material may be adopted for a specific use. Non-limiting examples of thermoplastic polymers include but are not limited to high-density polyethylene (HDPE) (if a rigid component having strength and durability is required), polyethylene, polypropylene, polyester and nylon or polyolefin-based polymer, a polystyrene-based polymer, a polycarbonate polymer, or mixture thereof.

At least one vibration-damping cable or rope ring is embedded in the body 12. Each vibration-damping rope is composed of a plurality of individual wires. The individual wires are preferably made of steel although other metals may be selected for this use. The wires within the vibration-damping rope may be made of the same metal or of different metals.

As illustrated, a pair of concentric vibration-damping rope rings is embedded in the body 12 composed of a composite matrix. The pair includes an outer vibration-damping rope ring 14 and an inner vibration-damping rope ring 16. A greater or lesser number of vibration-damping rope rings may be provided depending on the specific application.

Figure 2:
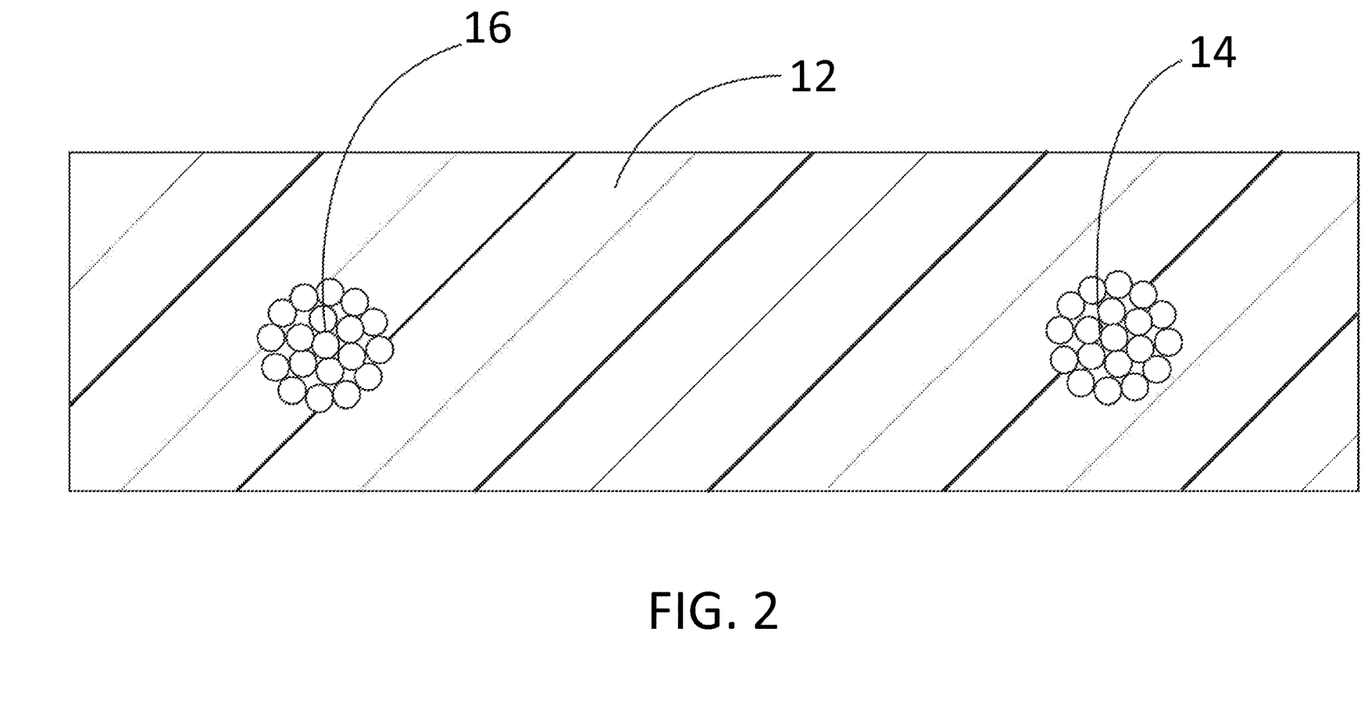
FIG. 2 is taken along line 2-2 of FIG. 1.

FIG. 2 is taken along line 2-2 of FIG. 1 and illustrates a more detailed view of the body 12 and the arrangement of the individual wires within the vibration-damping outer rope ring 14 and the vibration-damping inner rope ring 16. The illustrated spacing of the vibration-damping outer rope ring 14 and the vibration-damping inner rope ring 16 is only suggestive and is not intended as being limiting.

Figure 3:
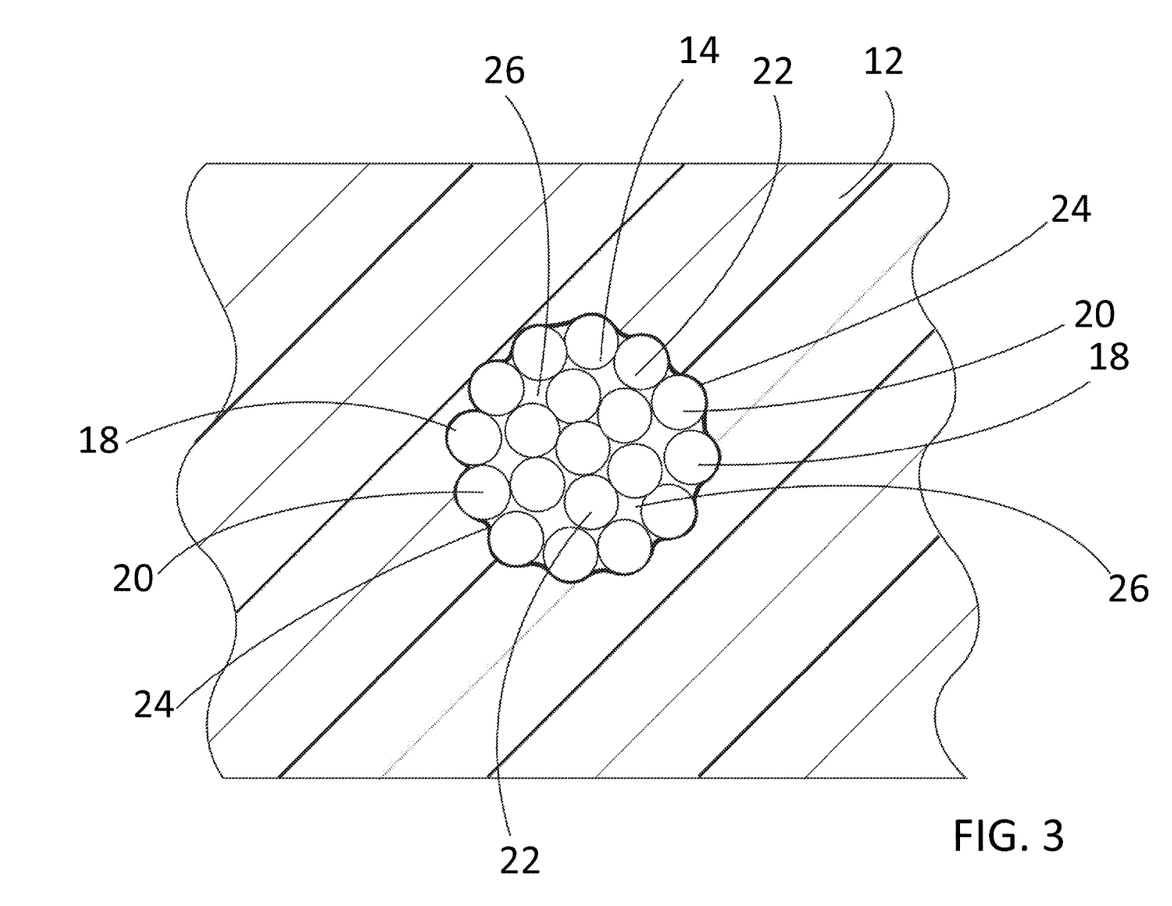
FIG. 3 is a close-up view of the rope embedded in the composite matrix according to the disclosed inventive concept.

A close-up view of the rope embedded in the composite matrix according to the disclosed inventive concept is illustrated in FIG. 3. With reference to that figure, a vibration-damping rope, such as the vibration-damping rope 14, is shown in detail. The vibration-damping rope 14 includes a plurality of individual wires 18. In general, the individual wires of the metal ropes can have an arbitrary cross section though a circular cross section is a preferred option due to a lower cost and availability. In each case, individual wires of metal ropes have a tensile strength of 201 MPa or higher.

The individual wires 18 include an outer layer of wires 20 and an inner group of wires 22. A composite matrix-rope interface 24 is formed between the composite matrix and the outer layer of individual wires 20, thereby leaving composite-free inter-wire spaces 26 between the inner group of wires 22 and between the inner group of wires 22 and the center-facing surfaces of the outer layer of wires 20.

The prevention of inflow of composite material beyond the outer layer of wires 20 is prevented by controlling the degree of tightness of the wrap of the rope. By wrapping the individual wires 18 tightly in the production of the vibration-damping rope 14, composite infiltration beyond the outer layer of wires 20 is restricted. In addition or as an alternative, the outer layer of wires 20 can be pre-treated with a protective coating using materials compatible with the base composite material thereby preventing composite infiltration during the molding process. Another option to prevent solid bonding between the inner wire surfaces and the composite matrix is to collectively wrap the individual cables in a thin metal sheath that full encompasses all of the wires.

Figure 4:
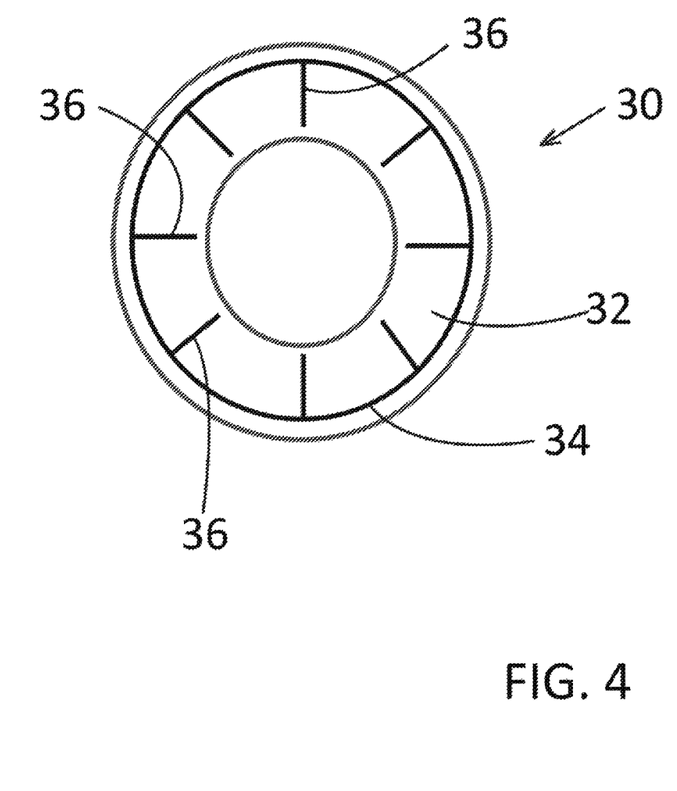
FIG. 4 is a sectional view of a plate- or disk-shaped component formed from a composite material having another configuration of embedded metal ropes according to an embodiment of the disclosed inventive concept.

Referring to FIG. 4, a sectional view of an alternate embodiment of a hypothetical plate- or disk-shaped component 30 is illustrated. The hypothetical plate-shaped component 30 includes a body 32 that is preferably formed from a thermoplastic polymer, although other materials such as a metal or a ceramic material may be adopted for a specific use. The non-limiting examples of thermoplastic polymers noted above with respect to FIG. 1 may be utilized in the production of the hypothetical plate-shaped component 30.

At least one vibration-damping rope ring 34 is embedded in the body 32. The illustrated embodiment provides the vibration-damping rope ring 34 adjacent the outer periphery of the body 32. Extending inward from the vibration-damping rope ring 34 toward the approximate center of the body 32 is a plurality of embedded elongated vibration-damping rope segments 36 of which a greater or lesser number of segments may be provided. In addition, one or more additional vibration-damping rope rings may be included. Like the vibration-damping outer rope ring 14 and the vibration-damping inner rope ring 16 of the hypothetical plate-shaped component 10, each of the vibration-damping ropes 34 and 36 is composed of a plurality of individual wires.

Figure 5:
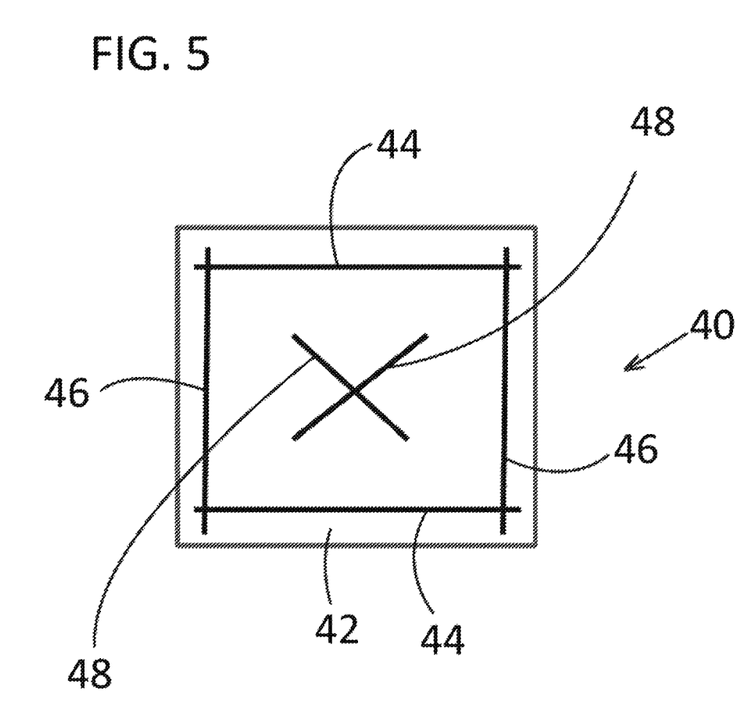
FIG. 5 is a sectional view of a square- or rectangular-shaped component formed from a composite material having one configuration of embedded metal ropes according to an embodiment of the disclosed inventive concept.

Referring to FIG. 5, a sectional view of a hypothetical rectangular-shaped component 40 is illustrated. The hypothetical rectangular-shaped component 40 includes a body 42 that is preferably formed from a thermoplastic polymer, although other materials such as a metal or a ceramic material may be adopted for a specific use. The non-limiting examples of thermoplastic polymers noted above with respect to FIG. 1 may be utilized in the production of the hypothetical rectangular-shaped component 40.

A first pair of spaced apart, embedded and elongated parallel ropes 44 is provided adjacent the outer edge of the body 42. A second pair of spaced apart, embedded and elongated parallel ropes 46 is also provided adjacent the outer edge of the body 42. The spaced apart, embedded and elongated parallel ropes 44 are generally perpendicular to the spaced apart, embedded and elongated parallel ropes 46.

An intersecting set of ropes 48 is provided in the approximate center of the body 42. Like the vibration-damping outer rope ring 14 and the vibration-damping inner rope ring 16 of the hypothetical plate-shaped component 10, each of the vibration-damping ropes 44, 46 and 48 is composed of a plurality of individual wires. A greater or lesser number of segments may be embedded. In addition, one or more additional vibration-damping rope rings may be included.

Figure 6:
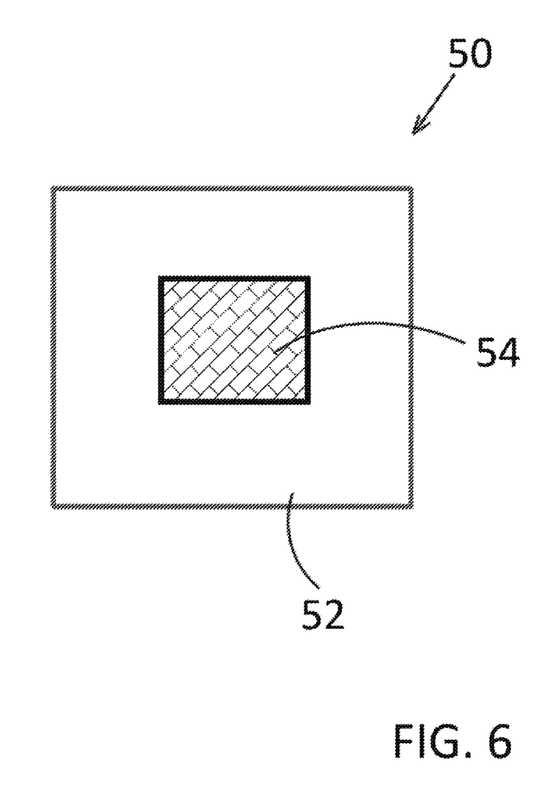
FIG. 6 is a sectional view of a square- or rectangular-shaped component formed from a composite material having another configuration of embedded metal ropes according to an embodiment of the disclosed inventive concept.

Referring to FIG. 6, a sectional view of another embodiment of a hypothetical rectangular-shaped component shown and is generally illustrated as 50. The hypothetical rectangular-shaped component 50 includes a body 52 that is again preferably formed from a thermoplastic polymer, although other materials such as a metal or a ceramic material may be adopted for a specific use. The non-limiting examples of thermoplastic polymers noted above with respect to FIG. 1 may be utilized in the production of the hypothetical rectangular-shaped component 50.

A centrally-provided array of woven ropes 54 is included in the body 52. Not shown but optionally provided are elongated ropes of the type illustrated in FIG. 5. Like the vibration-damping outer rope ring 14 and the vibration-damping inner rope ring 16 of the hypothetical plate-shaped component 10, each of the vibration-damping ropes of the array of woven ropes 54 is composed of a plurality of individual wires.

In addition to providing vibration damping for individual composite components as set forth above, the disclosed inventive concept may also provide vibration damping in structural components such as beams for integral application with adjacent structures. Such composite beams having embedded vibration damping ropes are illustrated in FIGS. 7 through 9 and are discussed in conjunction therewith. It is to be understood that the beam constructions and applications shown in these figures are illustrative only and are not intended as being limiting. Variations as to beam shape and size may be adopted together with the number, length and position of the embedded vibration-damping ropes. In addition to the illustrated beam, the component may also be selected from the group consisting of a plate, a solid body, a body having voids that are sealed from the environment, and a body having voids that are not sealed from the environment. Any such component may be adapted for any of several uses.

Referring to FIG. 7, a generalized example of a pin-pinned beam structure made of composite material and reinforced by vibration-damping ropes according to the disclosed inventive concept is shown. The pin-pinned beam structure, generally illustrated as 60, includes a body 62 composed of a composite material as discussed above. Illustratively, one end of the pin-pinned beam structure 60 may rest and pivot upon a point such as a fixed fulcrum 64. The other end of the pin-pinned beam structure 60 has a lifting point 66. The fixed fulcrum 64 is the pivot point by which the body 62 may be pivoted while the lifting point 66 provides a resting point when the body 62 is lowered.

The body 62 has embedded therein a pair of spaced apart and axially-aligned parallel elongated ropes 68. The inclusion of the parallel elongated ropes 68 provides both vibration damping and added strength to the body 62. A greater or lesser number of ropes may be provided as needed for a specific application.

Referring to FIG. 8, a generalized example of a cantilevered beam structure made of composite material and reinforced by vibration-damping ropes according to an additional embodiment of the disclosed inventive concept is shown. The cantilevered beam structure, generally illustrated as 70, includes a body 72 composed of a composite material as discussed above. Illustratively, one end of the cantilevered beam structure 70 is attached to a fixed structure 74 such as a frame structure on a vehicle.

The body 72 has embedded therein a pair of spaced apart and axially-aligned parallel elongated ropes 76 as well as at least one perpendicularly-aligned elongated rope 78. The inclusion of the parallel elongated ropes 76 and the perpendicularly-aligned elongated rope 78 provide both vibration damping and added strength to the body 72. A greater or lesser number of ropes may be provided as needed for a specific application.

Referring to FIG. 9, a generalized example of a clamped-clamped beam structure made of composite material and reinforced by vibration-damping ropes according to a further embodiment of the disclosed inventive concept is shown. The clamped-clamped beam structure, generally illustrated as 80, includes a body 82 composed of a composite material as discussed above. Illustratively, one end of the clamped-clamped beam structure 80 is attached to a first fixed structure 84 and the other end of the clamped-clamped beam structure 80 is attached to a second fixed structure 86. The fixed structures 84 and 86 may be any fixed structure such as fixed structures on a vehicle.

The body 82 has embedded therein a plurality of vibration-damping rope segments. Particularly, three pairs of parallel and axially-aligned vibration-damping rope segments 88, 88' and 88" are provided. The inclusion of the three vibration-damping rope segments 88, 88' and 88" provide both vibration damping and added strength to the body 82. A greater or lesser number of ropes may be provided as needed for a specific application.

Regardless of the component, the method of manufacturing the component having a vibration-damping rope of the disclosed inventive concept follows a basic pattern. Initially, the outer surfaces of the wire ropes may be pre-treated with an adhesive. The mold for the component is then opened and one or more vibration-damping ropes are strategically placed in the mold. The vibration-damping ropes may be circular, linear or both. Each vibration-damping rope may have one or more insert locator tab attached thereto that extend beyond the outer periphery of the mold. The operator may rely on the tabs for proper positioning of the ropes within the mold during the molding process. The mold is then closed and the composite material is injected. Once formed, the component is removed from the mold.

The outer surfaces of the wire ropes are thus solidly bonded to the matrix compound or the fiber surfaces that surround them in the part mold. At the same time, the inner wire surfaces inside the ropes remain to be in sliding frictional contact between themselves. Thus an increase in the damping capacity of the resulting lightweight component is due to Coulomb friction developed at the contact interfaces between the inner surfaces of the individual wires inside the metal ropes when the component is subjected to dynamic loading. An additional advantageous feature is that the solid bonding between the outer surfaces of metal ropes and the matrix or the reinforcing material surfaces inside the component ensures its structural integrity.

The number, diameter, and internal configuration (such as, but not limited to, linear or helical) of the wires may be adjusted as needed for a particular configuration. For example, the individual wires may be positioned linearly or helically. A greater or lesser number of wires may be incorporated. By adjusting the length and diameter of the individual vibration-damping rope and by adjusting the number, diameter, and internal configuration of the wires, the vibration-damping rope according to the disclosed inventive concept may be virtually infinitely tuned for a broad variety of applications. Accordingly, the lengths, diameter, and internal configuration of the wires of the vibration-damping rope shown in the accompanying figures are only suggestive and are not intended as being limiting.

The composite component having one or more embedded vibration-damping ropes of the disclosed inventive concept has virtually unlimited applications and may be employed in any composite component regardless of shape and application. Because of the many conceivable variations of rope length and diameter, it may be adapted for a virtually unlimited number of uses without compromising its dampening effectiveness. Accordingly, so as not to limit the broad use of the invention as a vibration dampener according to the disclosed inventive concept, the vibration-damping rope of the disclosed inventive concept is illustrated in use in the hypothetical components illustrated herein.

One skilled in the art will readily recognize from such discussion, and from the accompanying drawings and claims that various changes, modifications and variations can be made therein without departing from the true spirit and fair scope of the invention as defined by the following claims.

What is claimed is:

1. A vibration-dampener system comprising:
   a body formed from a polymerized material;
   a rope ring embedded in said body, said rope ring comprising a plurality of metal wires, said wires including outer wires and inner wires, said outer wires being in direct contact with said polymerized material and said inner wires being free of direct contact with said polymerized material, whereby sliding movement of said inner wires relative to said outer wires dampens resonant vibration of the component; and
   an inwardly and radially-extending rope segment comprising a plurality of metal wires, said rope segment having a first end and a free second end, said first end being attached to said rope ring.

2. The vibration-dampener system of claim 1, wherein said inner wires have voids therebetween.

3. The vibration-dampener system of claim 1, wherein said rope ring is an elongated segment.

4. The vibration-dampener system of claim 1, wherein said body is disk-shaped.

5. The vibration-dampener system of claim 1, wherein said body has two parallel sides.

6. The vibration-dampener system of claim 1, wherein said body is selected from the group consisting of a beam, a plate, a solid body, a body having voids that are sealed from an environment, and a body having voids that are not sealed from the environment.

* * * * *